United States Patent [19]

Hodgson et al.

[11] Patent Number: 5,376,439
[45] Date of Patent: Dec. 27, 1994

[54] SOFT FILMS HAVING ENHANCED PHYSICAL PROPERTIES

[75] Inventors: William J. Hodgson, Baytown; Richard W. Halle, Houston; Charles L. Pierce, Baytown, all of Tex.

[73] Assignee: Exxon Chemical Patents Inc., Linden, N.J.

[21] Appl. No.: 219,754

[22] Filed: Mar. 29, 1994

Related U.S. Application Data

[63] Continuation of Ser. No. 945,769, Sep. 16, 1992, abandoned.

[51] Int. Cl.$^5$ .................. C08L 23/18; C08L 23/04; C08J 5/18
[52] U.S. Cl. .................. 428/220; 525/240; 525/222; 525/227; 525/221; 524/528; 428/516; 604/370
[58] Field of Search ............... 525/240, 221, 222, 227; 428/220

[56] References Cited

U.S. PATENT DOCUMENTS

| | | | |
|---|---|---|---|
| 3,645,992 | 2/1972 | Elston | 526/348.6 |
| 4,243,619 | 1/1981 | Fraser et al. | 526/128 |
| 4,668,752 | 5/1987 | Tominari et al. | 526/348.2 |
| 5,112,696 | 5/1992 | Roberts | 525/240 |
| 5,206,075 | 4/1993 | Hodgson | 525/240 |

FOREIGN PATENT DOCUMENTS

| | | |
|---|---|---|
| 0186279 | 7/1986 | European Pat. Off. . |
| 0221726 | 5/1987 | European Pat. Off. . |
| 0247897 | 12/1987 | European Pat. Off. . |
| 60-067546 | 4/1985 | Japan . |
| 61-028538 | 2/1986 | Japan . |
| 61-258849 | 11/1986 | Japan . |
| 62-010150 | 1/1987 | Japan . |
| 62-064846 | 3/1987 | Japan . |
| 01108288 | 4/1989 | Japan . |
| 90/03414 | 4/1990 | WIPO . |

OTHER PUBLICATIONS

"Structure/Property Relationships in Exxpol TM Polymers" Speed et al–Soc. of Plastic Eng.–Feb. 1991.

*Primary Examiner*—Carman J. Seccuro, Jr.
*Attorney, Agent, or Firm*—Jaimes Sher

[57] ABSTRACT

The present invention provides for a polymer composition comprising a blend of from about 25 to about 90% by weight of a very low density ethylene polymer having a density on the range of from about 0.88 to 0.925 g/cm$^3$, a melt index of from about 0.5 to about 7.5 dg/min, a molecular weight distribution not greater than about 3.5 and a compositional distribution breadth index greater than about 70%, and from about 10 to about 75% by weight of a low to medium density ethylene polymer having a density of from about 0.910 to about 0.935, a melt index of from about 0.5 to about 20, a molecular weight distribution greater than about 3.5 and a compositional breadth index less than about 70%.

The invention also provides for films prepared from this blend having single layer construction or having laminar ABA construction wherein the A or skin layers comprise the blend of this invention and the B or core layer comprises a different olefin polymer such as high density polyethylene.

Films of this invention exhibit excellent elongation, tensile and impact properties and also softness, feel and noise properties which render them eminently suitable for use as back sheet components in the fabrication of absorbent articles such as diapers, bed pads and like articles where such properties are desirable.

32 Claims, 3 Drawing Sheets

SOFT FILMS HAVING ENHANCED PHYSICAL PROPERTIES

This is a continuation of application Ser. No. 07/945,769, filed Sep. 16, 1992, now abandoned.

FIELD OF THE INVENTION

The present invention relates to polymer compositions and soft, tough film materials prepared therefrom which are useful in the fabrication of personal hygiene products such as diapers, bed pads and the like.

BACKGROUND OF THE INVENTION

The many applications for polyolefin film materials include their use as back sheet materials in the construction of diapers, bed pads and similar articles. Such articles are normally constructed of an absorbent inner layer disposed between a non-woven top sheet and a back sheet film. Films based on olefin polymers such as low density polyethylene, linear low density polyethylene, polypropylene and copolymers of ethylene with one or more comonomers such as vinyl acetate, acrylic acid, acrylic acid esters and other olefin monomers containing from 3 to 8 carbon atoms have been particularly preferred for such uses. These materials can be formulated to possess the requisite properties of flexibility and moisture impermeability which render them suitable for such applications.

It is also desirable that film materials used in such applications meet other criteria. For example, because such films come into contact with the user, they should be soft to the touch similar to cloth materials, and also, be quiet when rumpled or crinkled. They should at the same time also possess good physical properties such as tensile, elongation, puncture strength and impact strength so that they are not readily torn or punctured under conditions of normal or more rugged use.

One of the more preferred polymer materials which has been used in the preparation of the aforementioned film materials is linear low density polyethylene (LLDPE), mainly because of its film strength and toughness. LLDPE may be produced by copolymerizing ethylene with a $C_4$ to $C_{10}$ alpha-olefin. Generally the preferred alpha-olefins include those selected from butene-1, pentene-1, hexene-1, 4-methylpentene-1, heptene-1, and octene-1. The comonomers are present in amounts up to 20 weight percent, normally, between 3 and 14 weight percent(wt. %). The polymerization is conducted at low pressure using a chromium catalyst or Ziegler catalyst and may be carried out in the gas phase. The LLDPE produced by such methods has a density between 0.900 and 0.935 g/cm3 and a melt index (MI) between 0.1 and about 25.0 grams/10 min, more preferably from about 0.1 to 5.0 grams/10 min. Manufacturing processes for the production of LLDPE are known such as disclosed in U.S. Pat. Nos. 4,076,698 and 4,205,021.

Despite the good properties of films made using LLDPE, the melt processing properties of the polymer tend to restrict the process conditions under which cast films having a uniform thickness can be made. For example, a typical process for preparing an embossed film for use as diaper backsheet material is the slot-die cast extrusion process wherein the polymer is heated to a temperature generally in the profile range of about 350° F. to about 550° F. in an extruder and extruded through a slot die into the nip of a steel and rubber roll system. Where the film is to be embossed, the steel roll is engraved with a pattern of either protrusions (a male embossing roll) or depressions (a female embossing roll). The rubber roll serves as a backing roll into which the steel roll pattern is impressed during the formation of the film. Thus the roll system serves both to film-form and texture the polyolefin material. The speed of the rubber and steel rolls is maintained to permit continuous embossing of the film and subsequent take up of the film on a wind up roller after it exits the steel/rubber roller nip.

In terms of process efficiency, the film manufacturer is highly motivated to adjust processing conditions such as temperature, roll speeds and take-up speeds to maximize the rate of film production on the one hand while on the other hand producing a quality film having a substantially uniform film thickness, which is generally in the range of about 0.75 to 2 mils.

A particular property of LLDPE which tends to restrict the line speed at which film made from this polymer can be processed is caused by a phenomena referred to as draw resonance. Draw resonance is defined as the inability of the film to hold a constant film thickness down the film web in the machine or take-up direction, which is evidenced by the presence of light and dark bands running across the film. The light areas are a thinner gauge and the darker areas are of a thicker gauge. The degree of draw resonance is a direct function of line speed, becoming worse at higher line speeds. As a result, the maximum line speed at which good quality film can be produced is restricted by the onset of draw resonance.

Attempts have been made to improve the draw resonance of LLDPE by utilizing a blend of this material with up to about 50% by weight of another polyethylene having a higher Melt Index than LLDPE, such as high pressure low density polyethylene (LDPE) having a Melt Index of at least about 7.5. dg/min and a density in the range of from about 0.910 to 0.930 g/cm³ or as an alternative EVA's can be blended with LLDPE. However, draw resonance is still found to occur at higher line speeds (e.g., 500 ft/min) with such blends and the presence of a substantial amount of the LDPE in the blend serves to diminish the good tensile and elongation properties of film material when compared with material containing LLDPE as the sole polymer.

Recently, a new class of low density ethylene polymers have been introduced into the marketplace. These materials are characterized as very low density ethylene polymers having a density in the range of from about 0.88 to about 0.915 g/cm3, a melt index of from about 0.5 to about 7.5 dg/min, a molecular weight distribution (MWD) of no greater than 3.5 and a compositional distribution breadth index (CDBI) greater than about 70 percent. Compositionally, these polymers contain ethylene copolymerized with up to about 15 mole % of another alpha monoolefin containing from 3 to 20 carbon atoms such as butene-1, hexene-1, octene-1 and the like. These polymers with narrow MWD and narrow CD provide a unique balance of properties including narrow melting point range and improved toughness when fabricated into shaped articles as compared with normal low density polyethylene prepared by the conventional Ziegler catalyst systems.

One of the primary uses of such materials is as a heat seal component as is shown in copending U.S. appplication Ser. No. 916,736 filed Jul. 15, 1992 or layer used in conjunction with the preparation of packaging films constructed from polyolefin polymers such as polypropylene as is shown in copending U.S. application Ser. No. 660,402 filed Feb. 21, 1991 both of which are herein fully incorporated by reference. The narrow melting point range of these polymers renders them extremely useful in packing fill operations where it is desirable to develop strong seal strength immediately after packaging and while the film is still hot from the sealing operation.

SUMMARY OF THE INVENTION

The present invention provides for a polymer composition comprising a blend of from about 25 to about 90% by weight of a very low density ethylene polymer having a density on the range of from about 0.88 to 0.925 g/cm$^3$, a melt index of from about 0.5 to about 7.5 dg/min, a molecular weight distribution not greater than about 3.5 and a compositional distribution breadth index greater than about 70%, and from about 10 to about 75% by weight of a low to medium density ethylene polymer having a density of from about 0.910 to about 0.935 g./cm3, a melt index of from about 0.5 to about 20 dg/min, a molecular weight distribution greater than about 3.5 and a compositional breadth index less than about 70%.

The polymer composition of this invention may be fabricated into film material by cast extrusion processes and exhibit improved draw resonance such that film of uniform and constant thickness may be obtained at higher manufacturing take-up speeds.

The invention also provides for films prepared from this blend having single layer construction or having laminar ABA construction wherein the A or skin layers comprise the blend of this invention and the B or core layer comprises a different olefin polymer such as high density polyethylene.

Films of this invention exhibit excellent elongation, tensile and impact properties and also softness, feel and noise properties which render them eminently suitable for use as back sheet components in the fabrication of absorbent articles such as diapers, bed pads and like articles where such properties are desirable.

BRIEF DESCRIPTION OF THE DRAWINGS

The foregoing advantages and features of the invention will become clearer and more fully understood when the following detailed description is read in conjunction with the accompanying drawings, in which.

DETAILED DESCRIPTION OF THE INVENTION

Figure 1:
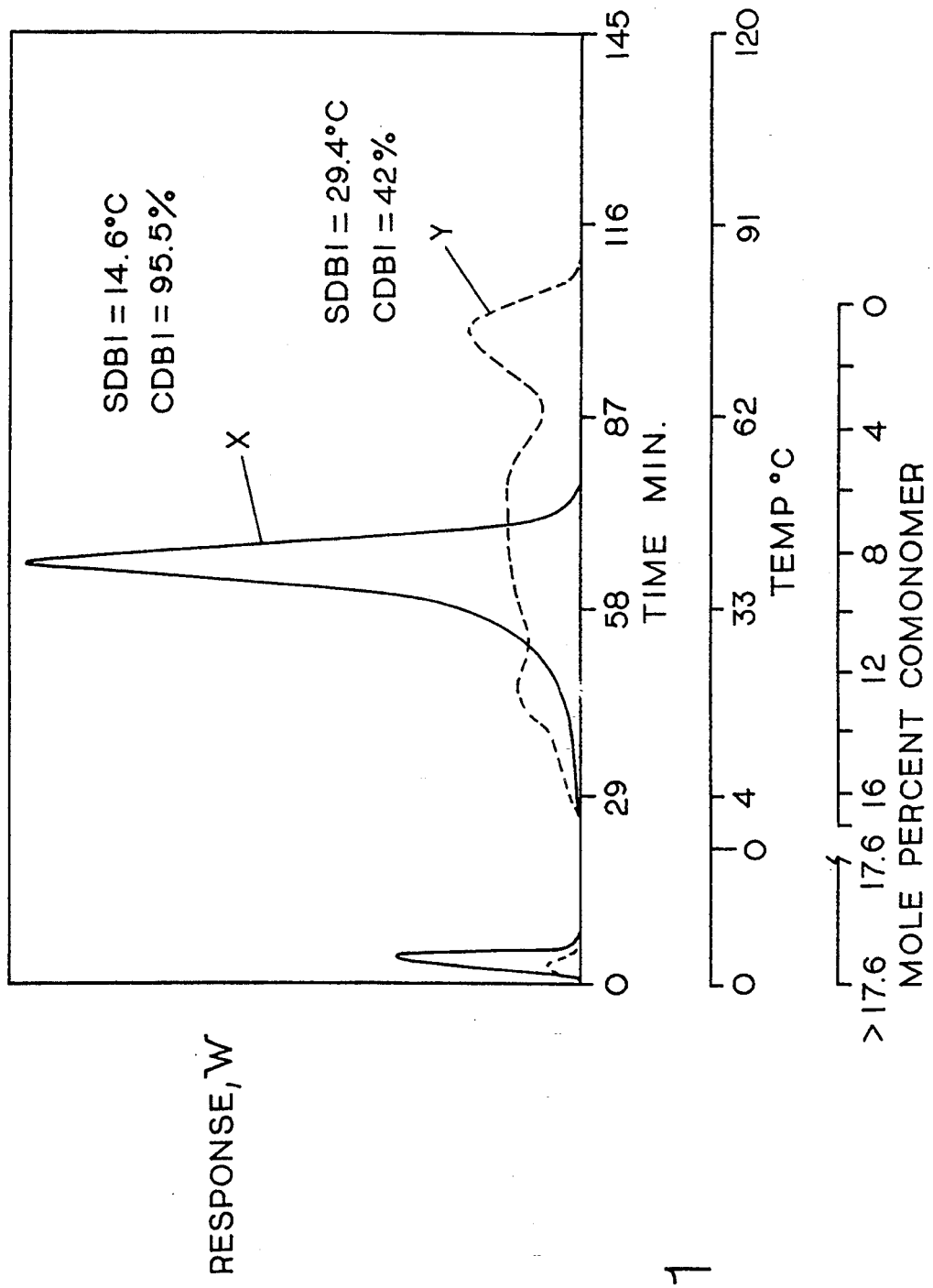
FIG. 1 is a graph of the solubility distribution and composition distribution of a copolymer (X) having a narrow SDBI and CDBI.

The very low density ethylene polymers (VLDPE) which may be used as one component in the films of this invention are ethylene/alpha-monoolefin copolymers wherein the monoolefin can have from 4–20 carbon atoms such as ethylene/butene-1, ethylene/hexene-1 and ethylene/octene-1, copolymers or terpolymers of olefins having from 4–20 carbon ataoms such as ethylene/butene-1/hexene-1. These ethylene copolymers and terpolymers with prescribed range of monomer levels can be prepared by polymerization of the suitable olefins in the presence of supported or unsupported metallocene catalysts systems. The preferred range of comonomer level generally ranges from about 4 to about 15 mole percent.

These copolymers have a density in the range of about 0.88 g/cm3 to about 0.925 g/cm$^3$. Preferably the density is in the range of about 0.885 g/cm$^3$ to about 0.91 g/cm$^3$. Densities above about 0.90 g/cm$^3$ are measured using standard accepted procedures. At densities below about 0.90 g/cm$^3$, the samples are additionally conditioned by holding them for 48 hours at ambient temperature (23° C.), prior to density measurement. Preferred copolymers in accordance with the present invention are VLDPE copolymers of ethylene and a C$_4$ to C$_{10}$ alpha monoolefin, most preferably copolymers and terpolymers of ethylene and butene-1 and/or hexene-1.

The melt index (MI) of the ethylene/alpha-mono-olefin copolymers of the present invention is in the range of about 0.5 dg/min to about 7.5 dg/min. Preferably the MI is in the range of about 0.5 dg/min to about 5.0 dg/min, and the most preferred MI is in the range of 1.0 to 2.5 dg/min. MI as measured herein is determined according to ASTM D-1238 (190/2.16). High load MI is determined according to ASTM D-1238 (190/21.6). These copolymers also have a narrow molecular weight distribution. The ratio of Mw/Mn is generally in the range of about 1.5 to about 3.5, preferably in the range of about 2.0 to about 3.0.

The ethylene/alpha-mono-olefin copolymers should also have an essentially single melting point characteristic with a peak melting point (Tm) as determined by Differential Scanning Colorimetry (DSC) in the range of about 50° C. to about 115° C. Preferably the DSC peak Tm is in the range of about 80° C. to about 100° C. "Essentially single melting point" as used herein means that at least about 80% by weight of the material corresponds to a single Tm peak existing in the range of about 60°–115° C., and there is essentially absent from the polymer any substantial fraction of material which corresponds to a Tm peak found at a temperature higher than about 115° C., i.e., "essentially" the bulk material content of the polymer corresponds to a "single" melting point peak in the 60°–115° C. range, and "essentially" no substantial fraction of the material has a peak melting point in excess of about 115° C., as determine by DSC analysis.

DSC measurements are made on a Perkin Elmer System 7 Thermal Analysis System. Melting information reported are second melting data i.e. the sample in heated at a programmed rate of 10° C./min to a temperature above its melting range. The sample is then cooled at a programmed rate of 10° C./min to a temperature below its crystallization range. The sample is then reheated (2nd melting) at a programmed rate of 10° C./min.

The composition distribution breadth index (CDBI) of such VLDPE copolymers will generally be in the range of about 70 percent or higher. The CDBI is defined as the weight percent of the copolymer molecules having a comonomer content within 50 percent (i.e. ±50%) of the median total molar comonomer content. The CDBI of linear polyethylene, which does not contain a comonomer, is defined to be 100%.

The Composition Distribution Breadth Index (CDBI) is determined via the technique of Temperature Rising Elation Fractionation (TREF). CDBI determination clearly distinguishes the VLDPE copolymers of this invention (narrow composition distribution as assessed by CDBI values generally above 70%) from other low density polyethylenes available commercially today which generally have a broad composition distribution as assessed by CDBI values generally less than 55%. The benefits to the subject invention accrue through the specific use of VLDPEs of narrow composition distribution. The CDBI of a copolymer is readily calculated from data obtained from techniques known in the art, such as, for example, temperature rising elution fractionation as described, for example, in U.S. Pat. No. 5,008,204 filed Feb. 2, 1988 or in Wild, et al., *J. Poly. Sci, Poly, Phys, Ed.*, Vol. 20, p. 441 (1982) both of which are hereby fully incorporated by reference.

Solubility Distribution is measured using a column of length 164 cm and 1.8 cm ID (inner diameter) is packed with non-porous glass beads (20–30 mesh) and immersed in a temperature programmable oil bath. The bath is stirred very vigorously to minimize temperature gradients within the bath, and the bath temperature is measured using a platinum resistance thermometer. About 1.6 grams of polymer is placed in a sample preparation chamber and repeatedly evacuated and filled with nitrogen to remove oxygen from the system. A metered volume of tetrachlorethylene solvent is then pumped into the sample preparation chamber, where it is stirred and heated under 3 atmospheres pressure at 140° C. to obtain a polymer solution of about 1 percent concentration. A metered volume of this solution, 100 cc is then pumped into the packed column thermostated at a high temperature, 120° C.

The polymer solution in the column is subsequently crystallized by cooling the column to 0° C. at a cooling rate of ~20° C./min. The column temperature is then maintained at this temperature for 25 min. at 0° C. The elution stage is then begun by pumping pure solvent, preheated to the temperature of the oil bath, through the column at a flow rate of 27 cc/min. Effluent from the column passes through a heated line to an IR detector which is used to measure the absorbance of the effluent stream. The absorbance of the polymer carbon-hydrogen stretching bands at about 2960 cm$^{-1}$ serves as a continuous measure of the relative weight percent concentration of polymer in the effluent. After passing through the infrared detector the temperature of the effluent is reduced to about 110° C., and the pressure is reduced to atmospheric pressure before passing the effluent stream into an automatic fraction collector. Fractions are collected in 3° C. intervals. In the elution stage pure tetrachloroethylene solvent is pumped through the column at 0° C. at 27 cc/min for 25 min. This flushes polymer that has not crystallized during the cooling stage out of the column so that the percent of uncrystallized polymer (i.e. the percent of polymer soluble at 0° C.) can be determined from the infrared trace. The temperature is then programmed upward at a rate of 1.0° C./min. to 120° C. A solubility distribution curve, i.e. a plot of weight fraction of polymer solubilized as a function of temperature, is thus obtained.

The procedure for calculating the Solubility Distribution Breadth Index (SDBI) is set forth below. Solubility distributions of two ethylene interpolymers are shown in FIG. 1. Here, for illustration purposes only, Sample X has a narrow solubility distribution and elutes over a narrow temperature range compared to Sample Y, which has a broad solubility distribution. A solubility distribution breadth index (SDBI) is used as a measure of the breadth of the solubility distribution curve. Let w(T) be the weight fraction of polymer eluting (dissolving) at temperature T. The average dissolution temperature, $T_{ave}$, is given by $$T_{ave} = \int T\, w(T)dT, \text{ where } \int w(T)dT = 1.$$

SDBI is calculated using the relation:

$$SDBI(°C.) = [(T - T_{ave})^4 w(T)dT]^{\frac{1}{4}}.$$

(SDBI is thus analogous to the standard deviation of the solubility distribution curve, but it involves the fourth power rather than the second power to $T - T_{ave}$). Thus, for example, the narrow solubility distribution Sample X and the broad solubility distribution Sample Y in FIG. 1 have SDBI values equal to 14.6° C. and 29.4° C., respectively. The preferred values of SDBI are less than 28° C. and more preferred less than 25° C. and even more preferred less than 20° C.

Figure 2:
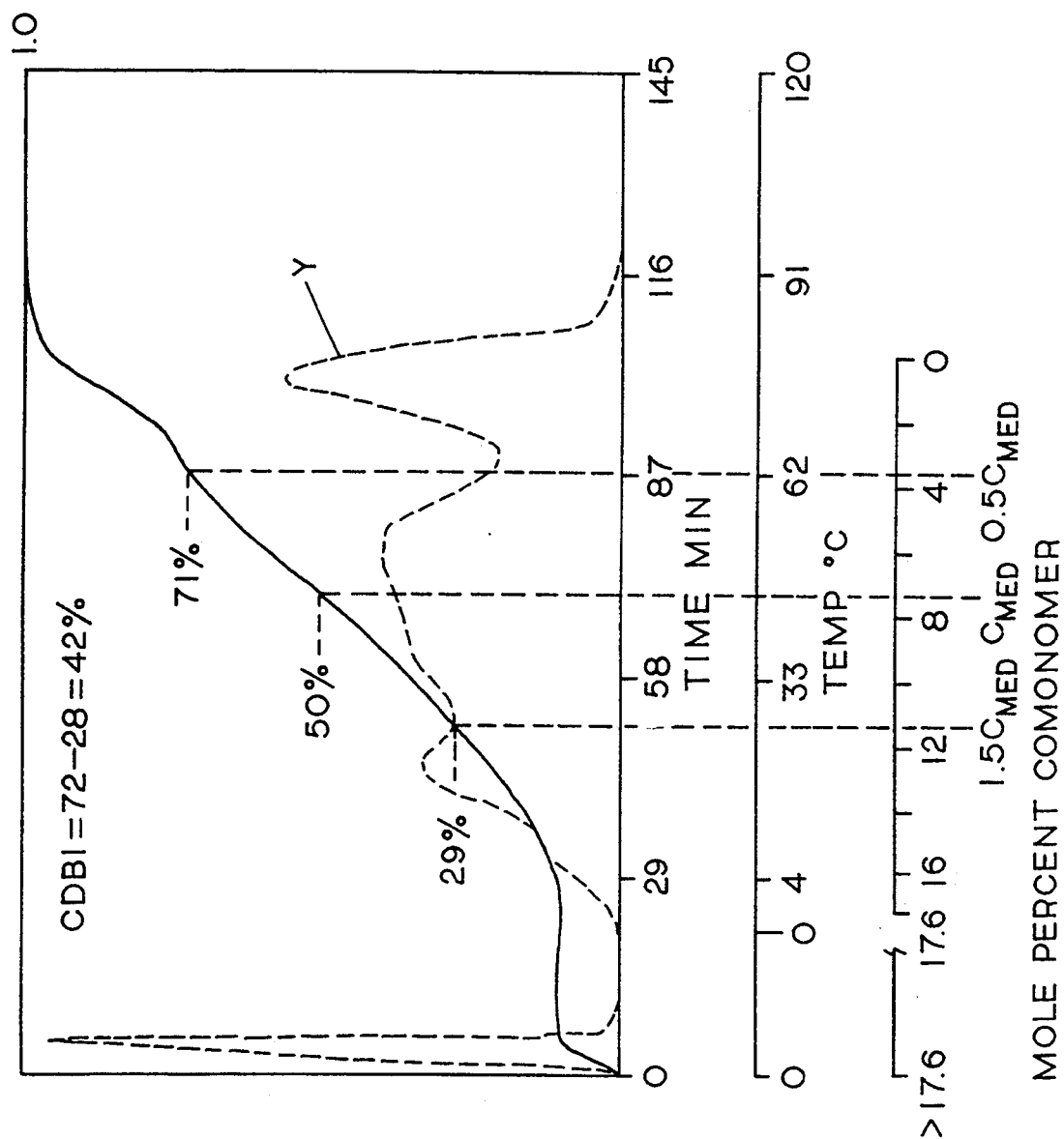
FIG. 2 is a graph illustrating the correlation between dissolution temperature and composition used to convert the temperature scale to a compositional scale.

The composition distribution (CD) of a crystalline interpolymer is determined as follows. The composition and number average molecular weight, $M_n$, of fractions collected in various narrow temperature intervals for several poly(ethylene-co-butene)'s was determined by C13 NMR and size exclusion chromatography, respectively. FIG. 2 is a plot of mole percent comonomer vs. elution temperature for fractions having $M_n > 15,000$. The curve drawn through the data points is used to correlate composition with elution temperature for temperatures greater than 0° C. The correlation between elution temperature and composition becomes less accurate as the $M_n$ of a fraction decreases below 15,000. Such errors can be eliminated by direct measurement of the composition of effluent fractions by C13 NMR. Alternatively, the elution temperature-composition calibration for high molecular weight fractions given in FIG. 2 may be corrected based on the $M_n$ of effluent fractions and an experimentally established correlation between $M_n$ and elution temperature that applies for $M_n < 15,000$. However, it is assumed that such low molecular weight molecules are present to a negligible extent and that any errors caused are negligible. A correlation curve such as the one in FIG. 2 is applicable to any essentially random poly(ethylene-co-α-olefin) provided, however, that the alpha-olefin is not propylene.

The temperature scale of a solubility distribution plot can thus be transformed to a composition scale, yielding a weight fraction of polymer vs. composition curve. As seen from the composition scale in FIG. 2, Sample X contains molecules spanning a narrow composition range, whereas Sample Y contains molecules spanning a wide composition range. Thus, Sample X has a narrow composition distribution whereas Sample Y has a broad composition distribution.

Figure 3:
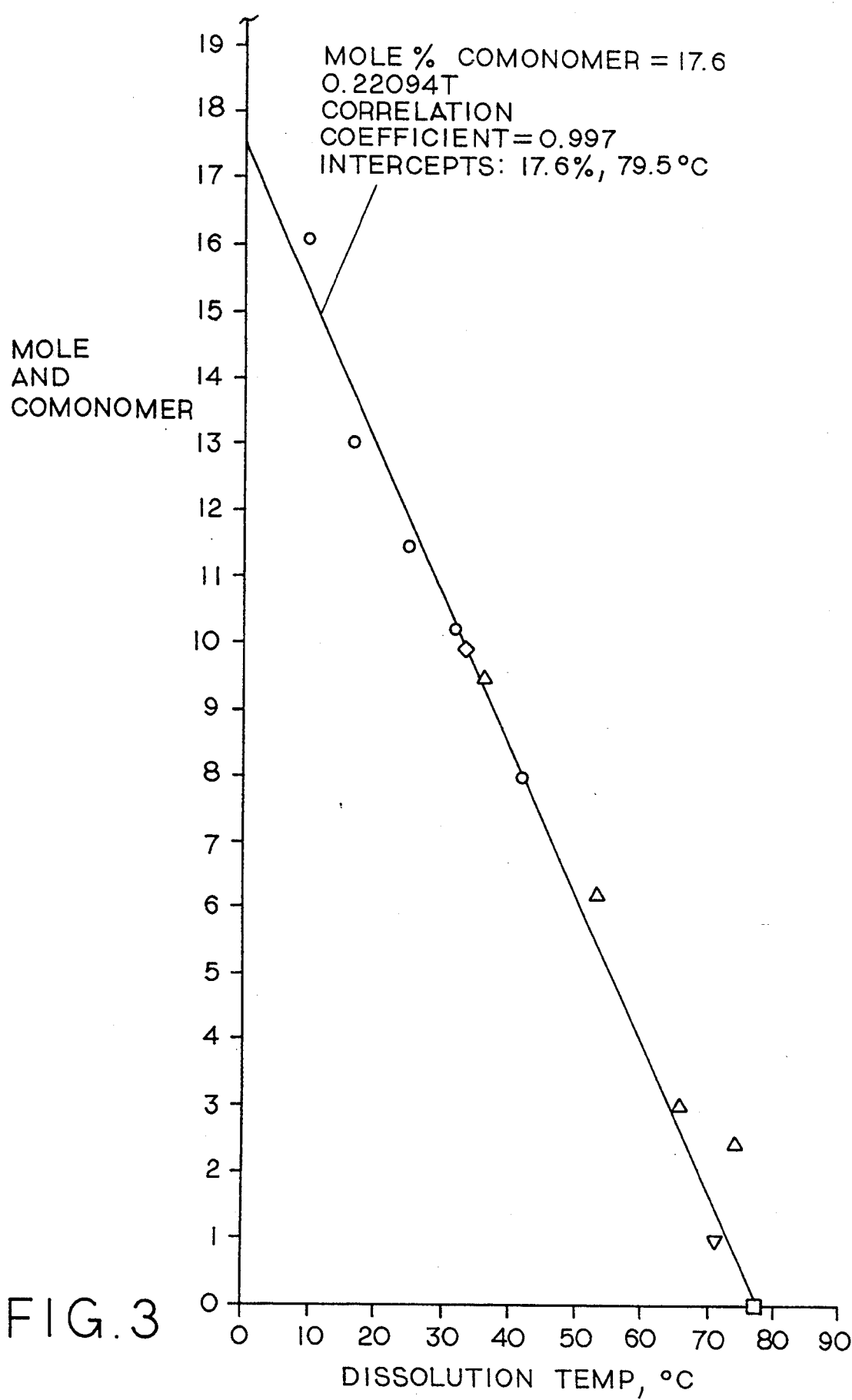
FIG. 3 is a graph illustrating the method for calculating CDBI.

A quantitative measure of the breadth of the composition distribution is provided by the Composition Distribution Breadth Index (CDBI). CDBI is defined to be the percent of polymer whose composition is within 50% of the median comonomer composition. It is calculated from the composition distribution cure and the normalized cumulative integral of the composition distribution curve, as illustrated in FIG. 3. The median composition, $C_{med}$, corresponds to the composition at the point where the cumulative integral equals 0.5. The difference between the values of the cumulative integral at compositions 0.5 $C_{med}$ and 1.5 $C_{med}$ (71−29, or 42%, in this example) is the CDBI of the copolymer. CDBI values fall between zero and one, with large values indicating narrow CD and low values indicating broad CD. Thus, now referring back to FIG. 15, the narrow and broad CD copolymers have CDBI's equal to 95.5% and 42%, respectively. It is difficult to measure the CD and CDBI of copolymers having very low comonomer content with high accuracy so the CDBI of polyethylenes with densities greater than 0.94 g/cc is defined to be equal to 100%. Unless otherwise indicated, terms such as "comonomer content", "average comonomer content" and the like refer to the bulk comonomer content of the indicated copolymer.

A class of highly active olefin catalysts known as metallocenes may be used in the preparation of these VLDPE copolymers. These catalysts, particularly those based on Group IVB transition metals such as zirconium, titanium and hafnium, show extremely high activity in ethylene polymerization. Metallocenes are well known especially in the preparation of polyethylene and copolyethylene-alpha-olefins. These transition metal metallocene compounds are generally represented by the formula $(Cp)_mMR_nR'_p$ wherein Cp is a substituted, unsubstituted, bridged, unbridged or a combination, cyclopentadienyl ring; M is a Group IVB,VB or VIB transition metal; R and R' are independently selected from a halogen, hydrocarbyl group, or hydrocarboxyl groups having 1-20 carbon atoms; m=1-3, n=0-3, p=0-3, and the sum of m+n+p equals the oxidation state of M.

Various forms of the catalyst system of the metallocene type may be used for polymerization to prepare the polymers used in this present invention including but not limited to those of homogeneous, supported catalyst type wherein the catalyst and cocatalyst are together supported or reacted together onto an inert support for polymerization by a gas phase process, high pressure process or a slurry or a solution polymerization process. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher as, for example, ultra high molecular weight linear polyethylene. At the same time, the molecular weight distribution of the polymers can be controlled from extremely narrow (as in a polydispersity, Mw/Mn of about 2), to broad (a polydispersity of about 8).

Exemplary of the development of these metallocene catalysts for the polymerization of ethylene is found in the disclosure of U.S. Pat. No. 4,937,299 to Ewen, et al. and EP 0 129 368-B1 published Jul. 26, 1989, fully incorporated herein by reference. Among other things, this patent teaches that the structure of the metallocene catalyst includes an alumoxane which is formed when water reacts with trialkyl aluminum with the release of methane, which alumoxane complexes with the metallocene compound to form the catalyst. However other cocatalysts may be used with metallocenes, such as trialkylaluminum compounds; or ionizing ionic compounds such as, tri(n-butyl)ammonium tetra(pentafluorophenyl) boron, which ionize the neutral metallocene compound. Such ionizing compounds may contain an active proton, or some other cation such as carbonium, which ionize the metallocene on contact, forming a metallocene cation associated with (but not coordinated or only loosely coordinated to the remaining ion of the ionizing ionic compound. Such compounds are described in EP-A-0 277 003 and EP-A-0 277 004 both published Aug. 3, 1988 and are hereby fully incorporated by reference. Further, the metallocene catalyst component can be a monocylopentadienyl heteroatom containing compound, which is activated by either an alumoxane or an ionic activator to form an active polymerization catalyst system to produce polymers useful in this present invention as is shown for example by PCT International Publication WO92/00333 published Jan. 9, 1992, U.S. Pat. Nos. 5,096,867 and 5,055,438, EP-A-0 420 436 and WO91/04257 all of which are fully incorporated herein by reference.

Utilizing a metallocene catalyst, the VLDPE copolymers useful as the low melting polymers of the present invention can be produced in accordance with any suitable polymerization process, including a slurry polymerization, gas phase polymerization, and high pressure polymerization process.

A slurry polymerization process generally uses superatmospheric pressures and temperatures in the range of 40°-100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

Alternatively, the VLDPE copolymer component of the present invention may be formed by gas-phase polymerization. A gas-phase process utilizes super-atmospheric pressure and temperatures in the range of about 50° C.–120° C. Gas phase polymerization can be performed in a stirred or fluidized bed of catalyst and product particles in a pressure vessel adapted to permit the separation of product particles from unreacted gases. Ethylene, comonomer, hydrogen and an inert diluent gas such as nitrogen can be introduced or recirculated so as to maintain the particles at a temperatures of 50° C.–120° C. Triethylaluminum may be added as needed as a scavenger of water, oxygen, and other impurities. Polymer product can be withdrawn continuously or semicontinuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The VLDPE copolymers of the present invention can also be produced in accordance with a high pressure process by polymerization ethylene in combination with other monomers such as butene-1, hexene-1, octene-1, or 4-methylpentene-1 in the presence of the catalyst system comprising a cyclopentadienyl-transistion metal compound and an alumoxane compound and the catalyst systems described above. It is important, in the high-pressure process, that the polymerization temperature be above about 120° C. but below the decomposition temperature of the polymer product and that the polymerization pressure be above about 500 bar (kg/cm2). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

The low to medium density ethylene polymer with which the VLDPE is blended to form the improved films of this invention may be characterized by a density in the range of from above about 0.910 to about 0.935 g/cm$^3$ and generally exhibit a higher melt index than the VLDPE component, i.e., a MI above about 3, preferably above about 5.0 and up to about 20, a molecular weight distribution above about 3.5 and a compositional distribution breadth index of less than about 70%, usually less than about 55%. These materials may be prepared by and not limited to conventional high pressure polymerization processes using free radical catalyst systems. Preferred polymers are low density polyethylene as well as low density copolymers of ethylene with up to about 30 mole % of a comonomer such as propylene, vinyl acetate, acrylic acid and lower alkyl esters of acrylic acid. Preferred LDPE polymers have a preferred density in the range of from above about 0.915 to about 0.930 g/cm$^3$ and a preferred MI in the range of from about 5 to 15.

The blend composition of the monolayer film contains from about 25 to about 90% by weight of the VLDPE and correspondingly from about 75 to 10% by weight of the low to medium density ethylene polymer, each based on the total weight of polymer present in the composition. More preferred levels range from about 50 to about 80% by weight of the VLDPE component, most preferably from about 50 to about 70% by weight of the VLDPE component.

As indicated above, the present invention also provides an embodiment wherein films of ABA construction may be prepared wherein the above described blend comprises the skin or A layers, and a different polyolefin polymer comprises the core or B layer. Because of the extremely good physical properties of films prepared from the VLDPE/LDPE blend material and particularly because of the enhanced noise reduction and softness properties of such films, such an ABA construction permits the utilization as the B core layer a material which might not otherwise be desirable for the fabrication of back sheet material due to excessive noise, poor feel or other factors. Such materials include conventional high density polyethylene having a density in the range from about 0.940 to about 0.980 g/cm3 and particularly scrap high density polyethylene which has been recycled and reclaimed, such as that reclaimed from milk or soft drink containers. Thus the invention provides for cost effective re-use of such materials and environmental benefits. The core layer may also contain minor amounts of the composition of the outer or skin layers so occasioned by the recycle of scrap or trim film back into the extruder to be mixed with the polymer used to prepare the core layer.

The films of the present invention may be fabricated using cast extrusion techniques well known in the art. For example, the monolayer film may be prepared by forming a uniform mixture of the polymer components and any other additives in a compounder extruder, extruding the mixture through a flat die at a temperature above the melting points of the polymer components, e.g. at temperatures from about 475° F. to about 550° F., to form a web, and casting the web on a chilled, smooth or patterned surface casting roll. For many applications it is preferred to emboss the cast film to produce a roughened pattern on the film surface such as disclosed in U.S. Pat. No. 4,436,520 to reduce the surface gloss of the film. This embossing may be carried out using a casting roll having a patterned surface and a pressure roll wherein the web is passed through the nip of these rolls. The resulting film is then cooled and wound, or the film may be further oriented by drawing in one or two mutually perpendicular directions by techniques well known in the art.

Where the film is a laminar film of ABA construction, the film may be prepared by the technique described above using coextrusion techniques. Thus the polymer forming the core layer, i.e., HDPE, is coextruded with the two outer layers using a multiple die coextruder, or molten layers of the outer layers may be applied to the surfaces of an extruded cast film of the core layer.

A particular advantage associated with films prepared using the polymer blend components of this invention is that the film exhibits improved draw resonance properties during the production processing steps.

The films of this invention may have an overall film thickness in the range of from about 0.50 to about 2 mil, more preferably from about 0.75 about 1.5 mil. Where ABA type laminar films are prepared, the core B layer may constitute from about 20 to about 75% by weight of the total film, more preferably from about 25 to about 60% by weight of the total film.

The polymer components used to fabricate the films of the present invention may also contain effective amounts of other additives normally included in such compositions. These include slip agents such as talc, antioxidants, fillers, dyes, pigments, radiation stabilizers, plasticizers and like additives.

For diaper backing applications, it is preferred to incorporate into the composition a light-colored pigment masterbatch concentrate (MB) composition which may contain a mixture of pigment, antioxidant, dispersant and other additives dispersed in a suitable olefin polymer matrix.

REFERENTIAL EXAMPLES

In order to provide a better understanding of the present invention including representative advantages thereof, the following referential examples are offered as related to actual tests performed in the practice of this invention, and illustrate the benefits of this present invention and not intended as a limitation on the scope of the invention.

EXAMPLE I

A monolayer film was prepared by mixing a polymer formulation having the composition set forth below in a 3½ inch Black Clawson extruder and melt extruding a web of the polymer at a temperature of approximately 500° F. vertically down into the nip between an embossing chill roll having a matte surface and a smooth surface rubber roll. The chill and rubber rolls were maintained at a temperature of about 130° to 140° C. and 50° to 60° C. respectively and at a contact pressure of about 40 psi to yield film material exiting the roll nip having an average thickness of about 1.2 to 1.3 mil. The resulting film was picked off the chill roll by a secondary chill roll maintained at about 60° C., taken up and wound at an initial speed of about 500 ft/min to yield a finished film having a thickness in the order of about 0.8 to 1.0 mil.

Once the system had stabilized under the aforementioned conditions, the rate of take-up (draw line speed) was slowly increased by increasing the speed of the take-up rolls and each film observed for the appearance of draw resonance as evidenced by light and dark bands running across the film.

The composition of the monolayer film prepared above was as follows:

a) 70% by weight of a very low density polyethylene based on a copolymer of ethylene and less than 10 mole % butene-1 having a density of 0.88 g/cm$^3$ and a Melt Index of 2.0 dg/min.;

b) 25% by weight of a high pressure low density polyethylene homopolymer having a density of 0.917 g/cm$^3$ and a Melt Index of 12.0 dg/min.;

c) 5% by weight of a masterbatch white pigment concentrate dispersed in polyethylene component (b).

CONTROL A

A control monolayer film was prepared as set forth in Example 1 with the exception that a linear low density polyethylene was substituted for VLDPE component (a) and in the same amount. This LLDPE was a copolymer of ethylene and about 3.5 mole % of hexene-1 having a density of 0.918 and a Melt Index 2.0

Films made from the composition of Example 1 and Control A were drawn at an initial rate of about 500 ft/min which speed was increased gradually to over 600 ft/min. The film of Example 1 drew down to a thickness of about 0.55 mil at a speed of 627 ft/min prior to breaking, with no indication of draw resonance up to the point where the film tore off. The Control A film exhibited draw resonance prior to reaching a draw speed of 600 ft/min.

EXAMPLES 2 AND 3

Example 1 was repeated using two additional formulations wherein the film components used in Example 1 were present at the following levels:

| Ex. 2 | |
|---|---|
| (a) VLDPE | 50% by weight |
| (b) LDPE | 45% by weight |
| (c) Pigment concentrate | 5% by weight |
| Ex. 3 | |
| (a) VLDPE | 30% by weight |
| (b) LDPE | 65% by weight |
| (c) Pigment concentrate | 5% by weight |

Films were drawn at a rate of 500 ft/min. Physical properties of these films as well as the Control A and Example 1 film (also drawn at 500 ft/min.) are shown in Table 1.

TABLE 1

| FILM | CONTROL A | EX. 1 | EX. 2 | EX. 3 |
|---|---|---|---|---|
| YAG$_1$ (mil) | 1.20 | 1.23 | 1.25 | 1.25 |
| DART IMPACT (g.) | 166 | 338 | 262 | 230 |
| TD$_2$ ULT. TENS. (g/in) | 1740 | 2672 | 2117 | 1754 |
| TD ULT. ELON. (%) | 671 | 733 | 698 | 676 |
| TD SEC MOD. (psi) | NT* | 12,430 | 14,170 | 14,570 |
| MD$_3$ ULT. ELON. (%) | 482 | 574 | 471 | 416 |
| MD ULT. TENS. (g/in) | 2184 | 3093 | 2484 | 2133 |
| MD SEC. MOD. (psi) | NT* | 11,910 | 14,070 | 13,820 |

$_1$YAG - Average film thickness calculated based on film weight and polymer density.
$_2$TD - Transverse direction
$_3$MD - Machine direction
*NT - Not tested

EXAMPLES 4, 5 AND 6

Three additional formulations were prepared and processed into monolayer film by the method set forth in Example 1. Components were blended at the following levels:

a) VLDPE*—67% by weight
b) LDPE (Same as Ex. 1)—28% by weight
c) Pigment Concentrate—5% by weight

*In Example 4, the VLDPE used was a copolymer of ethylene and butene-1 having a melt index of 2.2 and a density of 0.885.

In Example 5, the VLDPE used was a copolymer of ethylene and hexene-1 having a melt index of 2.2 and a density of 0.889.

In Example 6, the VLDPE used was a copolymer of ethylene and hexene-1 having a melt index of 2.2 and a density of 0.906.

CONTROL B

Example 1 as repeated with the same level of ingredients as in Examples 4-6 with the exception that a linear low density polyethylene (LLDPE) was substituted for the VLDPE and in the same amount. The LLDPE used in this Control was a copolymer of ethylene and octene-1 having a Melt Index of 2.5 and a density of 0.935.

Films made from the formulation of Examples 4-6 and Control B were cast and embossed to yield an average post emboss film gauge of 1.2 mils and drawn at an initial line speed of about 500 ft/min. For each film, the line speed was gradually increased until the film tore. Table 2 reports the melt temperature of the composition exiting the extruder, the observation of Draw Resonance, the film thickness just before the film tore and the film speed at the time of tear.

TABLE 2

| | MELT TEMPERATURE (°F.) | DRAW RESONANCE | FILM THICK. AT TEAR (MIL) | SPEED AT TEAR (FT/MIN) |
|---|---|---|---|---|
| EX 4 | 506 | NONE | 0.75 | 810 |
| EX 5 | 504 | NONE | 0.57 | 1066 |
| EX 6 | 509 | NONE | 0.70 | 872 |
| CONTROL B | 513 | YES (PRIOR TO 600 FT/MIN) | 0.67 | 920 |

As shown by the data in Table 2, none of the films made using formulations within the scope of this invention exhibited draw resonance prior to film tear, whereas the formulation of Control B exhibited draw resonance prior to draw speeds of 600 ft/min.

As indicated above, this invention also provides for laminar films of ABA construction wherein the A, or skin layers, comprise the blends of this invention and the B, or core layer, comprises a different polyolefin such as high density polyethylene. The following example illustrates the preparation of such a laminar film.

EXAMPLE 7

An ABA laminar film was prepared by coextruding a ground up, reclaimed high density polyethylene having a density of about 0.9616 g/cm$^3$ and the composition of Example 1 containing a mixture of 70% by weight of VLDPE, 25% by weight of LDPE and 5% by weight of pigment concentrate. These materials were coextruded at 519° to 526° F. through a coextrusion die at a rate of 400 lbs per hour in a configuration such that the HDPE formed the core B layer and the VLDPE mixture formed the skin A layers. The resultant film had a thickness of about 1.2 mil with the core layer having thickness of about 0.30 mil and each skin layer a thickness of about 0.45 mil.

CONTROL C

Example 7 was repeated except that a linear low density polyethylene (based on a copolymer of ethylene and 1-octene) was substituted for the VLDPE component of the skin layer formulation. The LLDPE had a melt index of 2.0 and a density of 0.918. The resulting film had a thickness of about 1.2 mil, with a core layer thickness of 0.30 mil and skin layer thickness of 0.45 mil each.

Properties of the resulting films are shown in Table 3.

TABLE 3

| FILM | EX 7 | CONTROL C |
| --- | --- | --- |
| CD-10% | 562 | 672 |
| TD-Break (g/in) | 2668 | 2247 |
| TD-Elong (%) | 702 | 693 |
| MD-Break (g/inc) | 3023 | 1926 |
| MD-Elong (%) | 583 | 396 |
| Dart Impact (g) | 198 | 123 |

NOTE:
CD-10% - Tensile strength at 10% Elongation
TD-Break - Tensile strength at break (transverse direction)
TD-Elong - Elongation at break (transverse direction)
MD - Machine direction As shown in Table 3, laminar films of the present invention exhibit markedly better physical and mechanical properties when compared with a comparable film containing a LLDPE instead of VLDPE in the skin layers.

While the present invention has been described and illustrated by reference to particular embodiments thereof, it will be appreciated by those of ordinary skill in the art that the invention lends itself to variations not necessarily illustrated hererin. For instance, the polymers useful in this present invention can be made using mixed transition metal metallocene catalyst systems or the line speeds of other film processing equipment not described can be increased significantly. Also, linear ethylene interpolymers described in copending U.S. application Ser. No. 490,642 filed May 25, 1990, herein fully incorporated by reference, are useful in increasing line speeds of film processing equipment. For this reason, then, reference should be made solely to the appended claims for the purposes of determining the true scope of the present invention.

What is claimed is:

1. A soft film comprising a mixture of:
   a) about 30 to about 90% by weight based on polymer content, of a copolymer of ethylene and a C$_4$ to C$_{20}$ alpha-olefin comonomer, said copolymer prepared with a metallocene catalyst system, having essentially a single melting point in the range of 60° C. to 115° C., having a density of from about 0.88 g/cm$^3$ to about 0.91 g/cm$^3$, a melt index of from about 0.5 to about 7.5 dg/min, a molecular weight distribution less than about 3.0 and a compositional breadth index greater than about 70 percent, and
   b) about 10 to about 70% by weight, based on polymer content, of a low density ethylene polymer prepared by a high pressure polymerization process having a density in the range of from about 0.91 to about 0.935 g/cm$^3$, a melt index than that of (a) up to about 20-dg/min and a molecular weight distribution above about 3.5; wherein said film has a secant modulus in the transverse direction of less than about 14,570 psi.

2. The film of claim 1 containing from about 50 to about 80% by weight of component (a) and from about 20 to about 50% by weight of component (b).

3. The film of claim 1 wherein component (a) comprises a copolymer of ethylene and a C$_4$ to C$_{10}$ alpha-monolefin.

4. The film of claim 3 wherein component (a) comprises a copolymer of ethylene and butene-1.

5. The film of claim 3 wherein component (a) comprises a copolymer of ethylene and hexene-1.

6. The film of claim 1 wherein component (b) is a low density ethylene polymer having a density of above about 0.915 g/cm3.

7. The film of claim 6 wherein said component (b) is an ethylene polymer having a melt index of from about 5 to about 15.

8. The film of claim 1 wherein said ethylene copolymer (a) contains from about 4 to about 15 mole percent of said comonomer.

9. The film of claim 1 wherein said component (a) is a terpolymer comprising said copolymer of ethylene and said C$_4$ to C$_{20}$ alpha-mono-olefin and an additional C$_4$ to C$_{20}$ alpha-olefin different from said alpha-mono-olefin.

10. A film prepared by melt extrusion and shaping the composition of claim 1.

11. The film of claim 10 having a thickness in the range of from about 0.5 to about 2 mil.

12. The film of claim 10 which is a monolayer film.

13. An article of manufacture made from the film of claim 10.

14. The film of claim 1 wherein said film is fabricated by melt extrusion at a line speed in excess of 600 ft/minute.

15. A film comprising a mixture of:
   a) about 30 to about 90% by weight based on polymer content, of a copolymer of ethylene and a C$_4$ to C$_{20}$ alpha-mono-olefin comonomer, said copolymer prepared with a metallocene catalyst system, having essentially a single melting point in the range of 60° C. to 115° C., having a density of from about 0.88 g/cm$^3$ to about 0.91 g/cm$^3$, a melt index of from about 0.5 to about 7.5 dg/min, a molecular weight distribution less than about 3.0 and a compositional breadth index greater than about 70 percent, and
   b) about 10 to about 70% by weight, based on polymer content, of a low density ethylene polymer prepared by a high pressure polymerization process having a density in the range of from about 0.91 to about 0.935, a melt index higher than that of (a) up to about 20 dg/min and a molecular weight distribution above about 3.5; wherein said film has a secant modulus in the machine direction of less than about 14,070 psi.

16. The film of claim 15 wherein said film comprises from about 50 to about 80% by weight of component (a) and from about 20 to about 50% by weight of component (b).

17. The film of claim 15 wherein said ethylene copolymer component (a) contains from about 4 to about 15 mole percent of said comonomer.

18. The film of claim 15 wherein said component (a) is a terpolymer comprising said copolymer of ethylene and said $C_4$ to $C_{20}$ alpha-mono-olefin comonomer and an additional $C_4$ to $C_{20}$ alpha-olefin different from said alpha-mono-olefin.

19. The film of claim 15 wherein said copolymer of ethylene and a $C_4$ to $C_{20}$ alpha-mono-olefin comonomer has a density in the range of 0.88 g/cm³ to about 0.90 g/cm³.

20. The film of claim 15 wherein the secant modulus in the machine direction is in the range of about 11,910 psi to about 14,070 psi.

21. A film comprising a mixture of:
   (a) about 30 to about 90% by weight based on polymer content, of a copolymer of ethylene and a $C_4$ to $C_{20}$ alpha-mono-olefin comonomer, said copolymer prepared with a metallocene catalyst system, having essentially a single melting point in the range of 60° C. to 115° C., having a density of from about 0.88 g/cm³ to about 0.91 g/cm³, a melt index of from about 0.5 to about 7.5 dg/min, a molecular weight distribution less than about 3.0 and a compositional breadth index greater than about 70 percent, and
   (b) about 10 to about 70% by weight, based on polymer content, of a low density ethylene polymer prepared by a high pressure polymerization process having a density in the range of from about 0.91 to about 0.935 g/cm³, a melt index higher than that of (a) up to about 20 dg/min and a molecular weight distribution above about 3.5; wherein said film has a secant modulus in the machine direction of less than about 14,070 psi and a secant modulus in the transverse direction of less than 14,570 psi.

22. The film of claim 21 wherein said film comprises from about 50 to about 80% by weight of component (a) and from about 20 to about 50% by weight of component (b).

23. The film of claim 21 wherein said ethylene copolymer component (a) contains from about 4 to about 15 mole percent of said comonomer.

24. The film of claim 21 wherein said component (a) is a terpolymer comprising said copolymer of ethylene and said $C_4$ to $C_{20}$ alpha-mono-olefin comonomer and an additional $C_4$ to $C_{20}$ alpha-olefin different from said alpha-mono-olefin.

25. The film of claim 21 wherein said copolymer of ethylene and a $C_4$ to $C_{20}$ alpha-mono-olefin comonomer has a density in the range of 0.88 g/cm³ to about 0.90 g/cm³.

26. The film of claim 21 wherein the secant modulus in the transverse direction is in the range of about 12,430 psi to about 14,570 psi.

27. The film of claim 15 wherein the secant modulus in the machine direction is in the range of about 11,910 psi to about 14,070 psi.

28. A diaper backsheet comprising a film according to claim 1.

29. The diaper backsheet of claim 28 wherein the film has a secant modulus in the machine direction of less than about 14,070 psi or a secant modulus in a transverse direction less than about 14,570 psi or both.

30. The diaper backsheet of claim 28 wherein said film comprises from about 50 to about 80% by weight of component (a) and from about 20 to about 50% by weight of component (b).

31. The film of claim 28 wherein said ethylene copolymer component (a) contains from about 4 to about 15 mole percent of said comonomer.

32. The film of claim 28 wherein said component (a) is a terpolymer comprising said copolymer of ethylene and said $C_4$ to $C_{20}$ alpha-mono-olefin comonomer and an additional $C_4$ to $C_{20}$ alpha-olefin different from said alpha-mono-olefin.

* * * * *